US012362460B2

(12) United States Patent
Wilson et al.

(10) Patent No.: US 12,362,460 B2
(45) Date of Patent: Jul. 15, 2025

(54) LENSED MULTIPLE BAND MULTIPLE BEAM MULTIPLE COLUMN DUAL-POLARIZED ANTENNA

(71) Applicants: Matsing, Inc., Irvine, CA (US); APG Technologies, Inc., Orange, CA (US)

(72) Inventors: John Stewart Wilson, Huntington Beach, CA (US); Igor Timofeev, Dallas, TX (US)

(73) Assignee: Matsing, Inc., Irvine, CA (US)

( * ) Notice: Subject to any disclaimer, the term of this patent is extended or adjusted under 35 U.S.C. 154(b) by 0 days.

(21) Appl. No.: 17/334,225

(22) Filed: May 28, 2021

(65) Prior Publication Data

US 2022/0384935 A1 Dec. 1, 2022

(51) Int. Cl.

| | |
|---|---|
| ***H01Q 1/24*** | (2006.01) |
| ***H01Q 3/46*** | (2006.01) |
| ***H01Q 5/30*** | (2015.01) |
| ***H01Q 19/10*** | (2006.01) |
| ***H01Q 25/00*** | (2006.01) |

(52) U.S. Cl.

CPC ............... *H01Q 1/246* (2013.01); *H01Q 3/46* (2013.01); *H01Q 5/30* (2015.01); *H01Q 19/104* (2013.01); *H01Q 25/001* (2013.01)

(58) Field of Classification Search

CPC ............ H01Q 1/246; H01Q 3/46; H01Q 5/30; H01Q 19/104; H01Q 25/001

See application file for complete search history.

(56) References Cited

U.S. PATENT DOCUMENTS

| | | | |
|---|---|---|---|
| 7,079,083 | B2 | 7/2006 | Gottl et al. |
| 7,405,710 | B2 | 7/2008 | Bisiules et al. |
| 7,605,768 | B2 | 10/2009 | Ebling et al. |
| 8,199,063 | B2 | 6/2012 | Moon et al. |
| 8,482,478 | B2 | 7/2013 | Hartenstein |
| 9,843,108 | B2 | 12/2017 | Le et al. |
| 10,381,716 | B2 | 8/2019 | Matitsine et al. |

(Continued)

FOREIGN PATENT DOCUMENTS

| | | | |
|---|---|---|---|
| WO | WO-2010/092078 | A2 | 8/2010 |
| WO | WO-2014/118011 | A1 | 8/2014 |

(Continued)

OTHER PUBLICATIONS

International Search Report and Written Opinion dated Sep. 16, 2022 for International Application No. PCT/US2022/031386, 10 pgs.

(Continued)

*Primary Examiner* — Graham P Smith
*Assistant Examiner* — Amal Patel
(74) *Attorney, Agent, or Firm* — Fish IP Law, LLP

(57) ABSTRACT

The inventive subject matter provides apparatus, systems and methods in which a high port count base station antenna uses an array of spherical lenses with multiple ports per frequency band, containing multiple frequency bands, and capable of multiple beam operation. In a preferred embodiment, the antenna system comprises a plurality of spherical, dielectric lenses, stacked vertically, where each lens is surrounded by four or more lower frequency radiating elements, or one circular element. The circular element can have multiple sub-elements, along with feed gaps.

18 Claims, 13 Drawing Sheets

(56) References Cited

U.S. PATENT DOCUMENTS

| | | | | |
|---|---|---|---|---|
| 11,139,583 | B2 | 10/2021 | Hu et al. | |
| 2005/0068251 | A1* | 3/2005 | Ebling | H01Q 3/247 343/911 L |
| 2012/0287005 | A1 | 11/2012 | Pintos et al. | |
| 2013/0307742 | A1 | 11/2013 | Hu et al. | |
| 2016/0111793 | A1 | 4/2016 | Montgomery et al. | |
| 2018/0097290 | A1 | 4/2018 | Matitsine et al. | |
| 2019/0027823 | A1* | 1/2019 | Matitsine | H01Q 1/2291 |
| 2019/0237874 | A1 | 8/2019 | Michaelis et al. | |
| 2020/0076079 | A1* | 3/2020 | Shan | H01Q 9/16 |
| 2021/0075120 | A1 | 3/2021 | Matitsine et al. | |

FOREIGN PATENT DOCUMENTS

| | | | |
|---|---|---|---|
| WO | WO-2015/035400 | A2 | 3/2015 |
| WO | 2019034117 | | 2/2019 |

OTHER PUBLICATIONS

Supplementary European Search Report for European Patent Application No. 22812281, dated Mar. 18, 2025, 12 pages.

* cited by examiner

LENSED MULTIPLE BAND MULTIPLE BEAM MULTIPLE COLUMN DUAL-POLARIZED ANTENNA

FIELD OF THE INVENTION

The field of the invention is wireless communication.

BACKGROUND

The background description includes information that may be useful in understanding the present invention. It is not an admission that any of the information provided herein is prior art or relevant to the presently clamed invention, or that any publication specifically or implicitly referenced is prior art.

As wireless networks data throughput, quality of service, capacity, and overall reliability continue to be challenged with the exponential growth of data and fifth generation (5G) services, network designers and operators are using more numerous radio transceivers with wider bandwidths and increasing number of ports to provide 4×4 MIMO (multiple input, multiple output), 256 QAM (quadrature amplitude modulation), and CA (Carrier Aggregation). Capacity is further improved by splitting cells from the traditional three sectors to six and nine sectors using multiple beams from a common antenna aperture. This creates a need for base station antennas that provide ultra-wide, multiple bands of high-performance sector coverage with as many ports as possible while maintaining the traditional base station antenna (BSA) apertures that have been seen on towers for decades. Example of the multi-port BSA could be found in https://www.commscope.com/catalog/antennas/product_details.aspx?id=69751, with 12 LB and HB ports, but it cannot provide splitting cells (for capacity improvement) and does not cover new 5G frequency bands (600 MHz and 3.3-4.2 GHz).

Lens based multiple beam antennas are growing in popularity due to their superior performance, notably in crucial port to port isolation, compared to the common Butler Matrix approach. The teaching of lightweight low loss artificial dielectric materials (see U.S. Pat. No. 8,518,537) opens new opportunities for wideband multiband multibeam antennas. Also, U.S. Pat. No. 8,199,063 teaches 4 LB dipoles, having bended arms, with a nested HB element between them. However, the disadvantage of the 063' reference is that of a narrow band for LB (<15%) and one beam only for HB operations.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems and methods in which a high port count base station antenna uses an array of spherical lenses with multiple ports per frequency band, containing multiple frequency bands, and capable of multiple beam operation.

In a preferred embodiment, an antenna system comprises a plurality of spherical, dielectric lenses, stacked vertically, where each lens is surrounded by four or more lower frequency radiating elements, or one circular element. In one embodiment of the invention, each lens is surrounded by four lower frequency dipole radiators, each radiator consists of dipole arms shaped in a circular arc with a radius of curvature similar to the radius of the lens. This multiple band array element structure can be used as the building block for one or more array columns to form high gain narrow vertical beam antenna ports.

A spherical lens is a lens with a surface having a shape of (or substantially having a shape of) a sphere. As defined herein, a lens with a surface that substantially conform to the shape of a sphere means at least 50% (preferably at least 80%, and even more preferably at least 90%) of the surface area conforms to the shape of a sphere. Examples of spherical lenses include a spherical-shell lens, the Luneburg lens, etc. The spherical lens can include only one layer of dielectric material, or multiple layers of dielectric material. A conventional Luneburg lens is a spherically symmetric lens that has multiple layers inside the sphere with varying indices of refraction.

The lower frequency elements are combined into one or more vertical arrays using a variable phase shift, remote electrical tilt capable, feed network. The higher frequency bands use radiators that illuminate a primary dielectric lens to create a plane wave phase front, combined in a vertical array using a variable phase shift, remote electrical tilt capable, feed network. One or more higher frequency vertical arrays can be used with a single column of lenses to produce multiple beams in the azimuth plane.

In a preferred embodiment, the higher frequency elements move on a circular arc near the surface of the primary lens. This movement can coincide or be independent with movement of higher frequency elements in other columns, or the structure consisting of the four lower frequency elements. It should be clear to those skilled in the art that a number of embodiments are possible using multiple columns of higher frequency arrays to form multiple beams.

Wideband multiband dual-polarized lensed multibeam base station phased array antennas and low-band radiators for such antennas are disclosed. Dual-polarized low band element has shape close to circular. One version of low band element comprises a conductive ring with 4 symmetrically located feed gaps.

Another version of low band element comprises four coupled symmetrical dipoles located in a circular LB element. Inside a circular LB element, a spherical dielectric lens is placed, with artificial dielectric as preferable option for lens structure. The low band radiator with lens is adapted for frequency band 600-960 MHz and provides a horizontal beamwidth of approximately 60 degrees. In some embodiments, low band elements are located in 2 columns to support 4×4 MIMO operation. The multi-band base station antenna comprises high-band radiators adapted for 1.69-2.69 GHz, with pairs of HB radiators placed inside some of low band elements, forming two output beams with horizontal beamwidth of approximately 35 degrees. In related embodiments, the multi-band base station antenna comprises high-band FB radiators adapted for 3.3-4.2 GHz, with pairs of HB radiators placed inside some of circular LB elements, forming two output beams with horizontal beamwidth of approximately 24 degrees.

In some embodiments, circular low band elements are combined in the same array with cross-shaped low band elements, with their horizontal and vertical arms interspersed amongst the high-band radiators. In another embodiment, radiation pattern optimization is achieved by combination of lenses with different diameter and/or truncation.

A LB element is key part of wideband multi-band dual-polarized lensed multibeam base station phased array antennas. Dual-polarized circular element are configured to fit with spherical lenses and be used in multiband multibeam antennas.

Various objects, features, aspects and advantages of the inventive subject matter will become more apparent from the following detailed description of preferred embodiments, along with the accompanying drawing figures in which like numerals represent like components.

DETAILED DESCRIPTION

Exemplary Embodiments

Figure 1A:
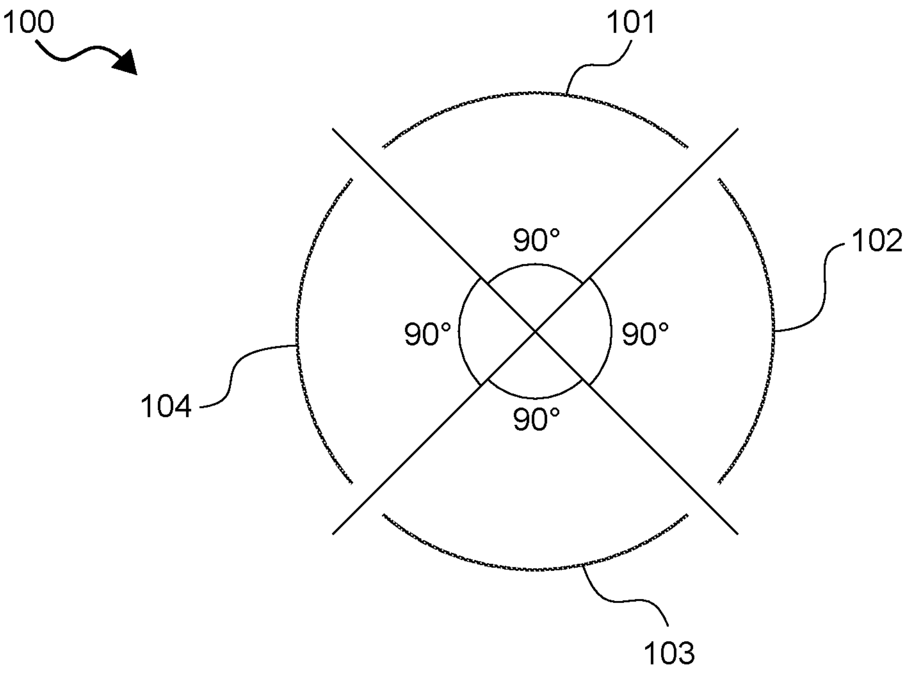
FIG. 1A is a schematic of a dual-polarized circular radiating element.
Figure 1B:
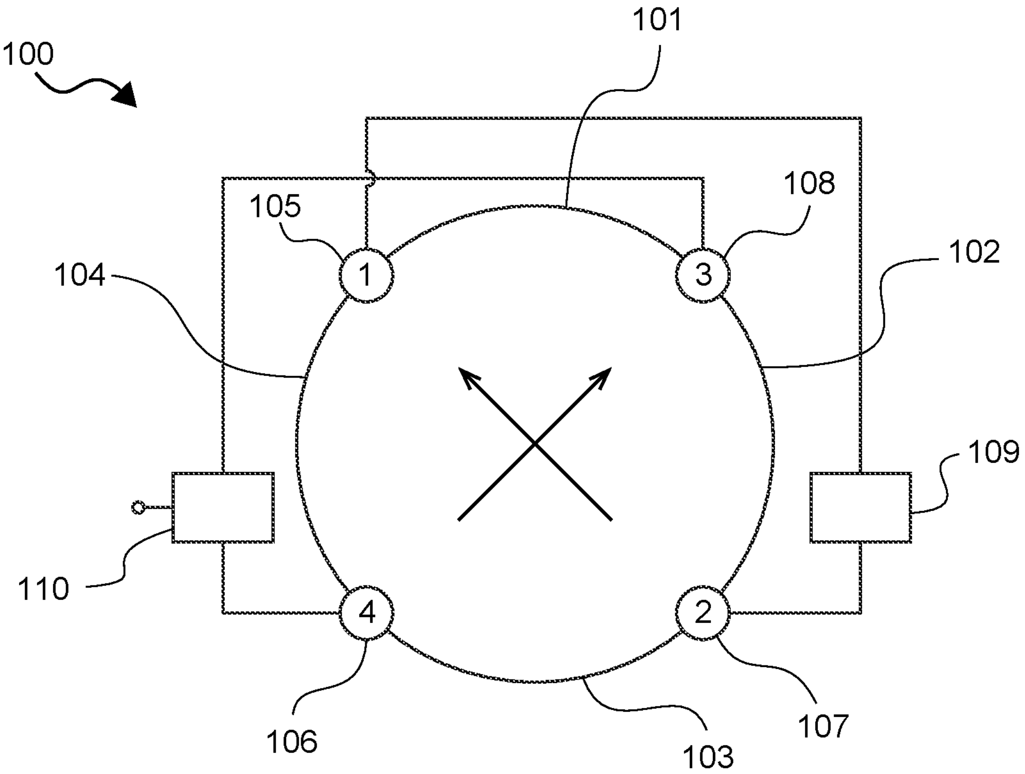
FIG. 1B is a schematic of a dual-polarized circular radiating element with baluns and power dividers.

FIG. 1A depicts an exemplary embodiment of dual-polarized circular radiating element 100 with a circular conductor having four sub-elements 101, 102, 103, and 104, along with 4 feed gaps. A circular radiating element can have, for example, a strip shape. Also, a circular radiating element can have circular, or rectangular or another cross-section, or can be printed on circuit board. In a preferred embodiment, feed gaps are located with 90° angle to each other (as shown in FIG. 1*a*). In some embodiments, baluns 105, 106, 107, and 108 are installed in the four feed gaps between the four sub-elements 101, 102, 103, and 104 to provide balanced excitation, as schematically shown in FIG. 1B. For +45° polarization, baluns 105 and 107 are connected in phase via power divider 110; for −45° polarization, baluns 108 and 106 are connected with the same phase via power divider 109. In certain embodiments, the diameter of element 100 is about $\lambda/2$, where $\lambda$ is wavelength of a central frequency. In a preferred embodiment, the shape of the element 100 is non-circular (polygonal, for example). To provide one side radiation, circular element can be disposed on reflector plane.

Figure 2A:
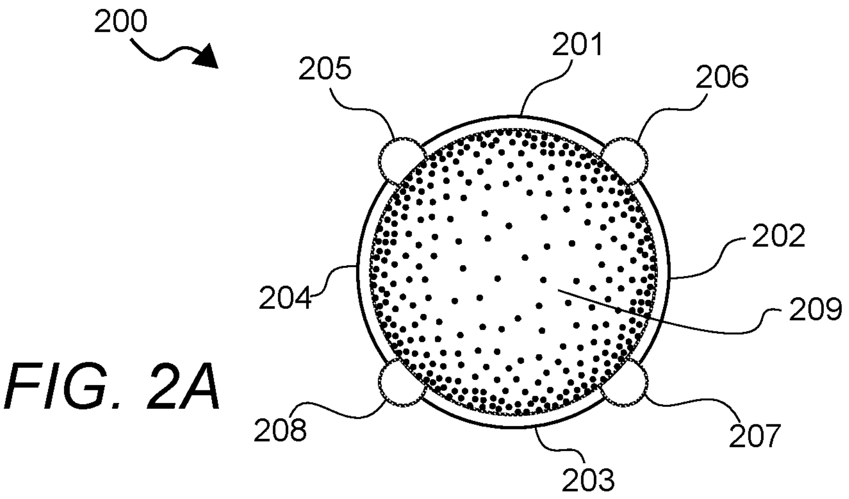
FIG. 2A illustrates an antenna array with a circular radiating element and baluns.

In some embodiments, for better beam shaping, a circular element can have spherical lens 103, as schematically shown in FIG. 2A. In some embodiments, spherical lens 103 has substantially the same diameter as circular element.

Figure 2B:
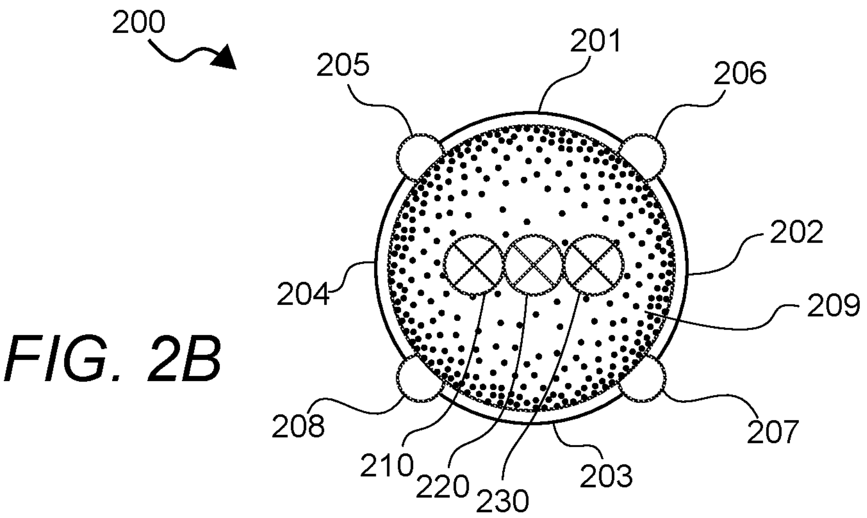
FIG. 2B illustrates an antenna array with a circular radiating element and three FB elements.
Figure 2C:
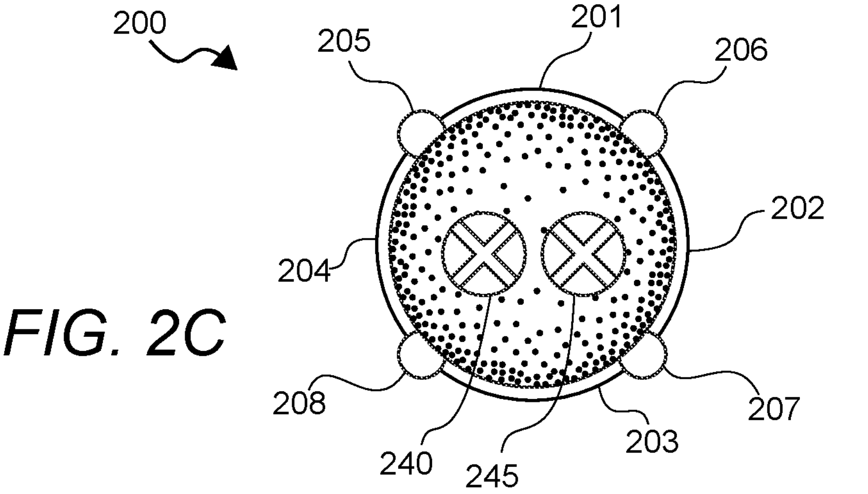
FIG. 2C illustrates an antenna array with a circular radiating element and two HB elements.

FIG. 2A depicts a 2-band multibeam antenna 200 having a lens 209, where baluns 205, 206, 207, and 208 are disposed between circular radiating sub-elements 201, 202, 203, and 204. In FIG. 2A-2C, feed lines are not shown for simplicity.

In FIG. 2B, a 2-band multibeam antenna 200 is depicted with circular LB sub-elements 201, 202, 203, and 204, and FB elements 210, 220, and 230 disposed behind the lens 209. This dual-band antenna 200 is configured to form one wide LB beam and 3 narrower FB beams (not shown). In a preferred embodiment, lens 209 is shaping LB beam and focusing FB beams.

In FIG. 2C, 2-band, multibeam antenna 200 is depicted with circular LB sub-elements 201, 202, 203, and 204, and HB elements 240 and 245 disposed behind the lens 209. In a preferred embodiment, lens 209 is configured to shape one wide LB beam produced via circular LB sub-elements 201, 202, 203, and 204, and focuses two narrower HB beams produced via HB elements 240 and 245. In an embodiment, lens 209 is shaping an LB beam and focusing HB beams.

Figure 3A:
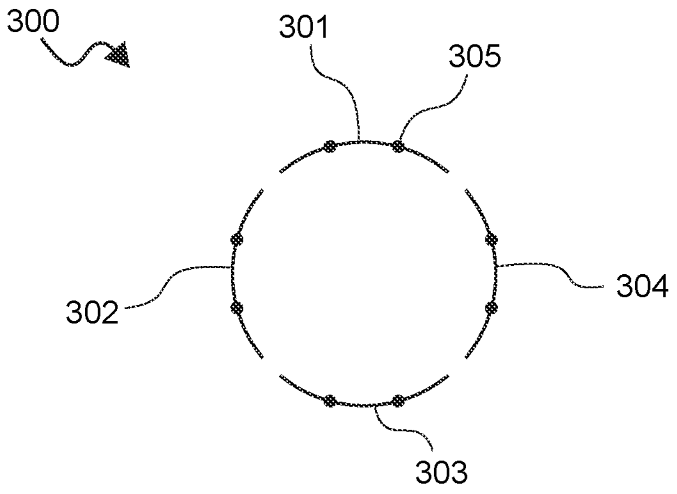
FIG. 3A is a schematic of a circular radiating element with circular radiating sub-elements and filters.

FIG. 3A depicts circular radiating element 300 with circular radiating sub-elements 301, 302, 303, and 304, along with filter 305. A filter can be a choke, a stop-band, or a low band filter. In a preferred embodiment, filter 305 is configured to reduce coupling between multiple LB and HB elements which are nested inside an LB element. In certain embodiment, filter 305 is stopping HB currents and making LB elements "invisible" for HB waves. Moreover, in some embodiments, filter 305 does not inhibit the transmission of LB elements.

Figure 3B:
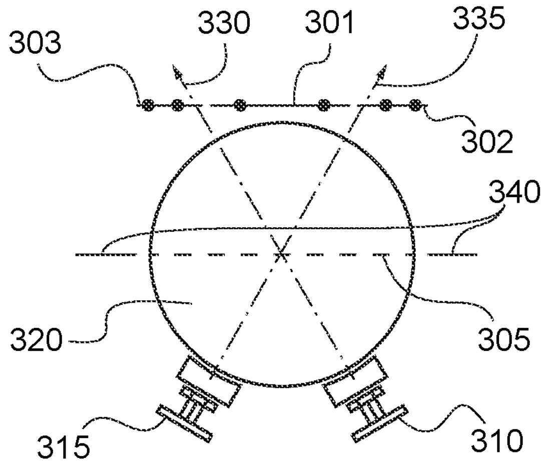
FIG. 3B illustrates an antenna having a circular radiating element disposed above the lens, a frequency-selective surface (FSS), and two HB elements.
Figure 3C:
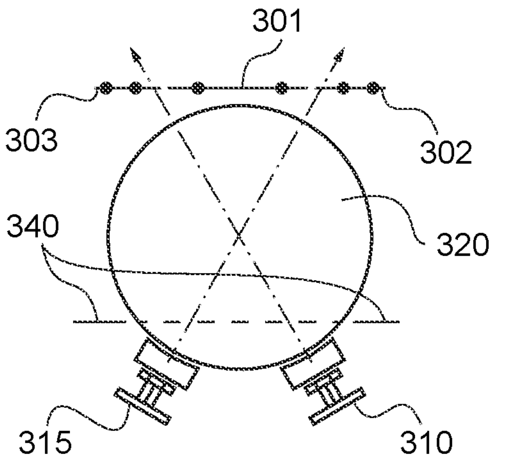
FIG. 3C illustrates another antenna having a circular radiating element disposed above the lens, a frequency-selective surface (FSS), and two HB elements.
Figure 3D:
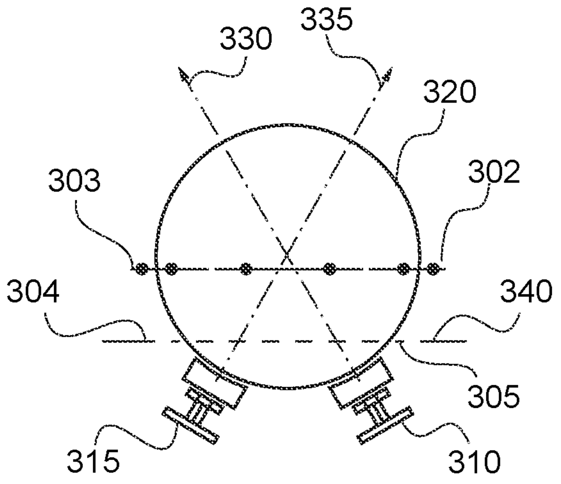
FIG. 3D illustrates an alternative antenna system having a circular radiating element disposed about the lens, a frequency-selective surface (FSS), and two HB elements.

FIG. 3B depicts lens 320 with a frequency-selective surface (FSS) 305 disposed inside lens 320, with 2 output beams (330 and 335) being produced by HB element 310 and 315, respectively. In FIGS. 3B-3D, lens 320 is "snapped" into the reflector 340. In a preferred embodiment, FSS 305 is transparent for HB elements 315 and 310, but serves as reflecting surface for circular radiating element 300, providing continuation for reflector 340. In a preferred embodiment, circular radiating element 300 is an LB element. In some embodiments, FSS 305 is located in center of the lens 320 (as shown in FIG. 3B), but in another cases, it can be placed closer to HB elements 315 and 310 (as shown in FIG. 3C). In some embodiments, FSS 305 can be extended out of lens (not shown). Advantageously, when circular radiating element 300 is located above or at equator of lens 320 (as shown FIG. 3D), the output beams produced by HB element 315 and 310 suffer minimal distortions.

Figure 5A:
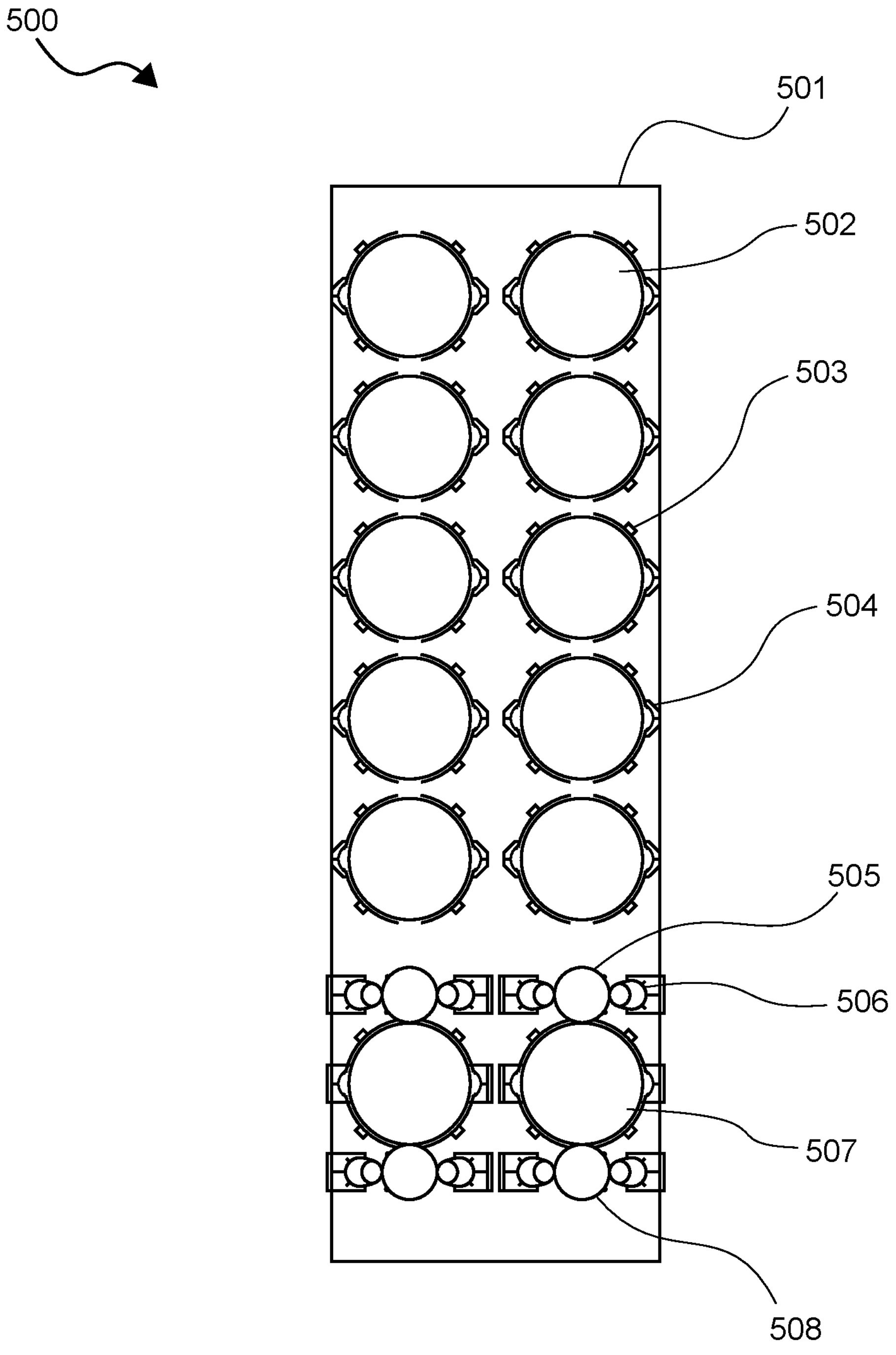
FIG. 5A illustrates an antenna array having a plurality of circular radiating elements, and nested HB elements.
Figure 5B:
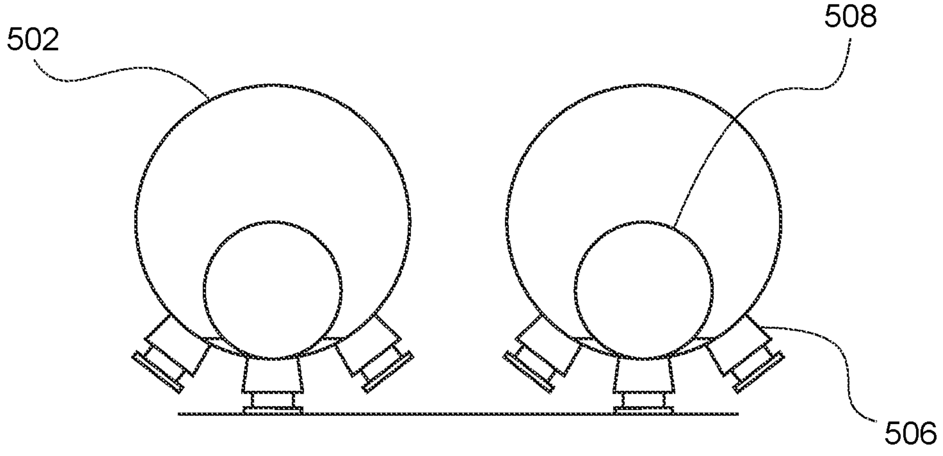
FIG. 5B illustrates a side view of an antenna array having a plurality of circular radiating elements, and nested HB elements.
Figure 5C:
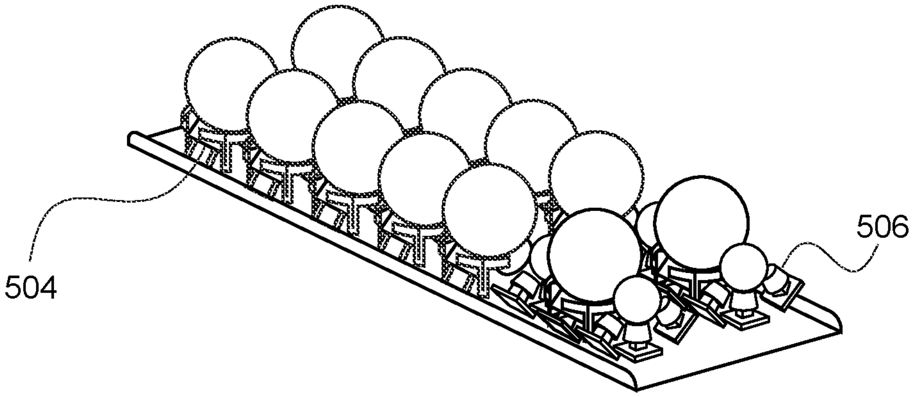
FIG. 5C illustrates an isometric view of an antenna array having a plurality of circular radiating elements, and nested HB elements.

In some embodiments, HB (FB) elements can be placed above common reflector 340 (FIG. 5A-5C).

In another 2-band embodiments, lens 320 can be used to form different (e.g. more than 2) number of beams (for example 3, 4 or 5 FB beams) which can benefit with 5G massive MIMO beamforming).

Figure 4:
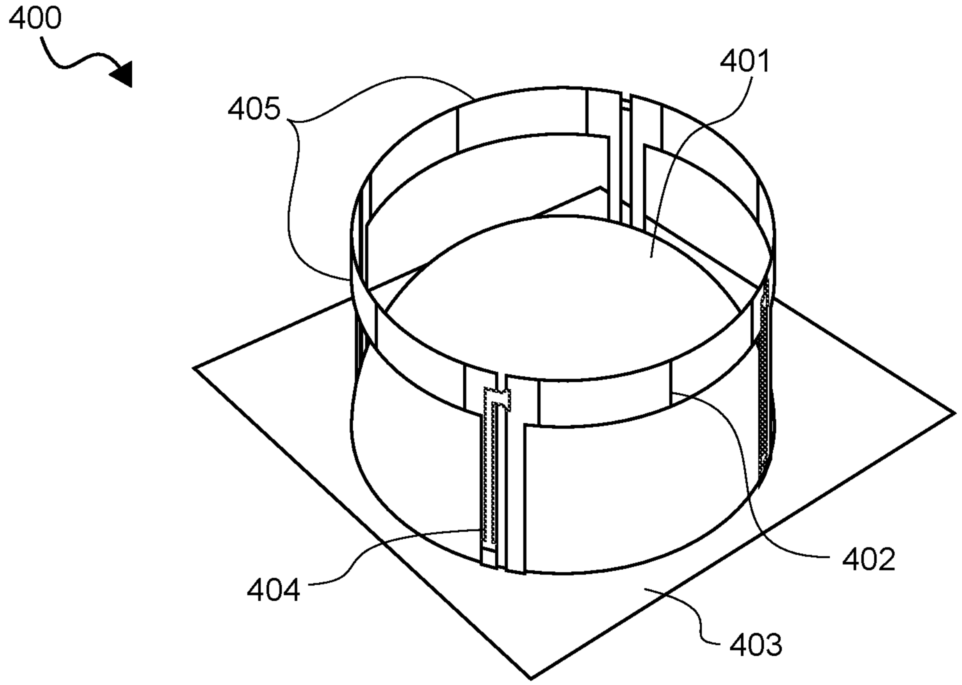
FIG. 4 illustrates an antenna having a circular radiating element disposed above the lens, a reflector, and a feedline.

FIG. 4 depicts antenna system 400 with LB circular element 405 disposed about spherical lens 401 and above reflector 403. In this embodiment, LB circular element 405 comprises four tightly coupled radiating sub-elements. Each radiating sub-element has a microstrip feedline 404 and slotted balun 402. By adjusting of the amount of coupling, wideband performance of LB circular element 405 can be achieved. In a preferred embodiment, wideband performance of LB circular element 405 is configured to be more than 60% of bandwidth. For the configuration depicted by of FIG. 4, for example, with 204 mm element diameter, HFSS simulation has shown return loss >16 dB, port-to-port isolation >35 DB in 600-900 MHz frequency band.

In exemplary embodiments, radiating sub-elements of LB circular element 405 are coupled via capacitive coupling or inductive coupling. In a related embodiment, a planar capacitor or an overlapping capacitor can be used to provide capacitive coupling. In a preferred embodiment, the arms of radiating sub-elements can include stop-band filters or chokes, similar as those described above.

Although a lens in general improves performance of LB element FIG. 2-FIG. 4, in some embodiments, proposed LB element has no lens. The dual-polarized solutions disclosed above can be used as independent antenna or as element of antenna array, including multibeam and multiband arrays.

The circular LB element with lens allows an extremely compact configurations, which is in particular suitable as a basic element for multiband/multibeam antennas with a plurality of columns (and/or rows).

In FIG. 5A-5C, antenna 500 with 2 columns of 8 LB circular elements is shown. FIG. 5A is a front view of antenna 500, FIG. 5B is a bottom view of antenna 500, and FIG. 5C is an isometric view of antenna 500. In an embodiment, forward from backplane 501 , lens 502 is disposed inside LB circular element 503, improving isolation between LB columns (>25 DB). In a preferred embodiment, the first five rows of RF elements are LB circular elements of the antenna 500, and each column contains two HB elements and a lens 502 surrounded by an LB element. HB elements, such as HB element 504, are connected via HB phase shifters (not shown) in phased array to allow each beam produced by the radiating element to be independently tilted. Advantageously, as a result of the quasi super-directivity of homogeneous spherical lens, HB grating lobes are effectively suppressed. For better upper sidelobe suppression, part of HB elements (or all of them) can be rotated (orbited) around lens 507 synchronically with beam tilt. FB elements, such as FB element 506, are connected via FB phase shifters (not shown) in phased array to allow each beam produced by the radiating element to be independently tilted.

In an exemplary embodiment, for an F-band (FB) antenna configuration, an array of 3 lensed 3-beam antennas is used for each column. As depicted by FIGS. 5B and 5C, differing diameter of lenses is used, two smaller lenses 505 and 508, and a larger lens 507 in center, where the lens 507 is nested in an LB element (not shown). The differing diameter of FB lenses is selected for FB beamwidth/sidelobes optimization and, also, to reduce spacing between neighboring LB elements. Also, in certain embodiments, lens 508 can be truncated from top and bottom to allow further reduction of spacing between neighbor LB elements. FB element 506 is connected to FB phase shifters (not shown) to form phased array to allow independent tilt for each output beam.

Figure 5D:
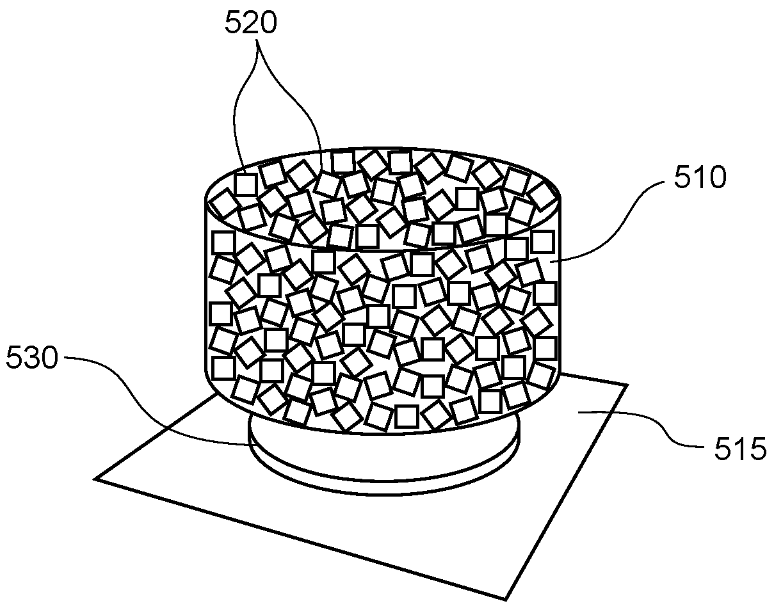
FIG. 5D illustrates an antenna with a lens having a non-spherical shape.

In certain embodiment, HB and FB elements are using secondary lenses. Secondary lenses are playing important role for optimization of radiation patterns of HB and FB antenna arrays. In a preferred embodiment, secondary lens 510 is placed above radiating element 530 and has a non-spherical shape, which provides benefits for pattern optimization, as shown in FIG. 5D. In certain embodiments, a secondary lens has circular shape on one side and oval/elliptical shape on other side with smooth transition between them. This shape is very beneficial for antennas with tightly packed beams. Other shapes (conical frustum, cylindrical, parallelepipedal, pyramidal, stepped pyramidal, pyramidal frustum, elliptical cylinder) can be used. In the same array, different shape and/or size of secondary lens can be used for performance improvements. For example, if antenna array has different spherical lens size (as shown in FIG. 5A-5C for F-band), for a smaller primary lens, a longer secondary lens can be used. A secondary lens can have uniform dielectric or layers with different dielectric constant. This allows to provide better array sidelobe suppression in elevation together with stable azimuth beam width. As shown in FIG. 5D, artificial dielectric material 520 is used as filling for a secondary lens 510 (see U.S. Pat. No. 8,518,537). In some embodiments, the main lens (not shown) can be preferably filled with artificial dielectric material for dramatical reduction of antenna weight, cost, insertion loss. In certain embodiments, secondary lens 510 can be isotropic. In other embodiments, secondary lens 510 can be anisotropic.

Figure 6:
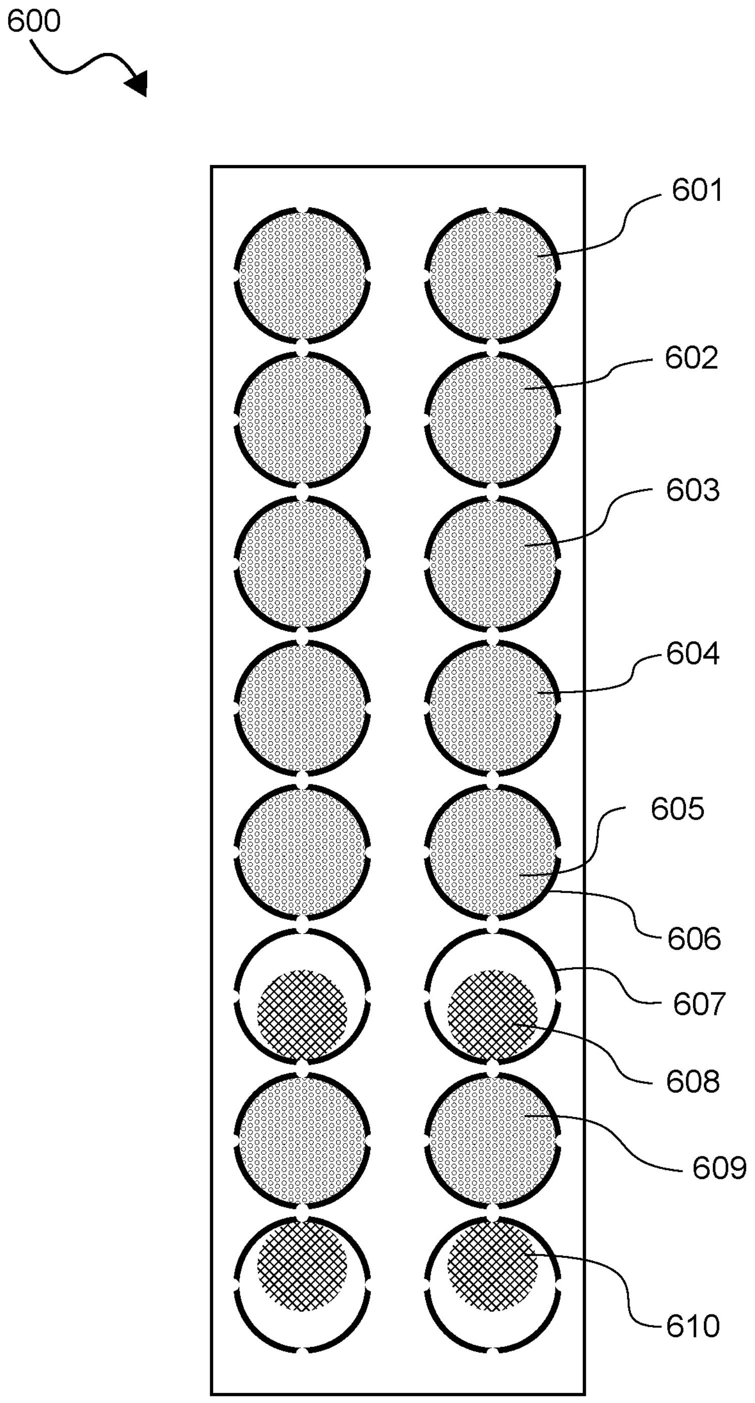
FIG. 6 illustrates a multibeam multiband antenna array having a plurality of circular radiating elements.

FIG. 6 is a schematic depicting multibeam multiband antenna array 600. Array 600 has 8 LB elements (arranged in equidistant array) in each of 2 columns. This can allow better LB upper sidelobe suppression, slightly higher gain and extended tilt range compare to the arrays depicted in FIG. 5A-5C. In a preferred embodiment, lenses 601, 602, 603, 604, and 605 are configured for operation with two HB elements. For F-band, lenses with different diameter are shown, where lens 609 is larger than lens 608 and lens 610. Also, in an exemplary embodiment, lens 609 has about the same diameter as LB element 607. Advantageously, similar diameters between the lens 609 and LB element 607 can be utilized with 4 FB beams for improved 5G beamforming.

Figure 7:
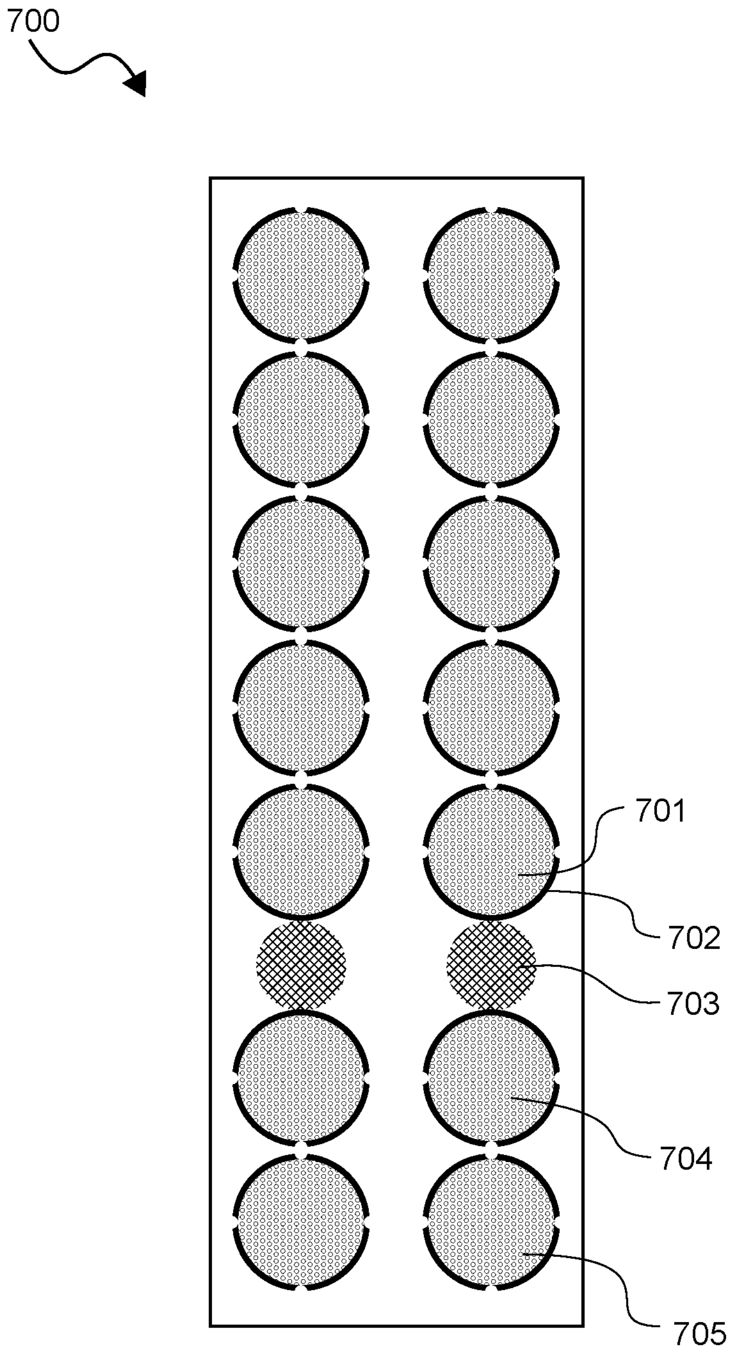
FIG. 7 illustrates a multibeam multiband antenna array having a plurality of circular radiating elements, and LB crosses.

FIG. 7 is a schematic depicting multibeam multiband antenna array 700, which has 7 LB elements 702 in each of 2 columns of lenses 701. In a preferred embodiment, the array 700 has a length of 6 ft. For FB, 2 bigger lenses (704 and 705) and one smaller lens (703) are used.

Figure 8:
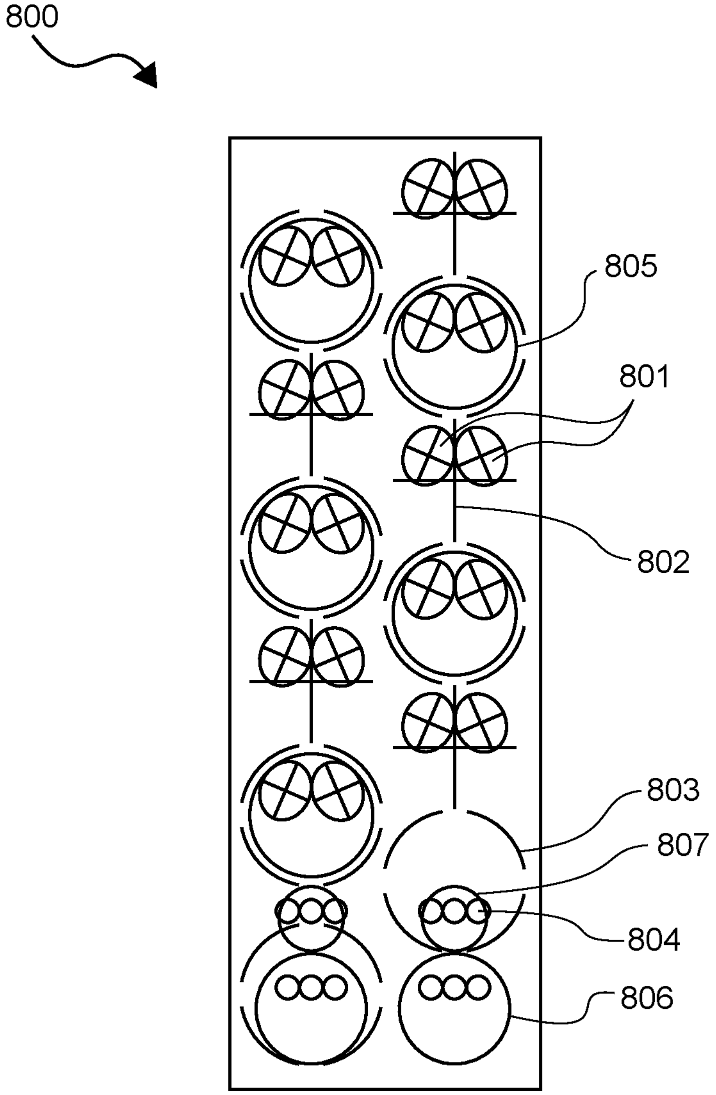
FIG. 8 illustrates another multibeam multiband antenna array having a plurality of circular radiating elements, LB crosses, and HB elements.
Figure 9:
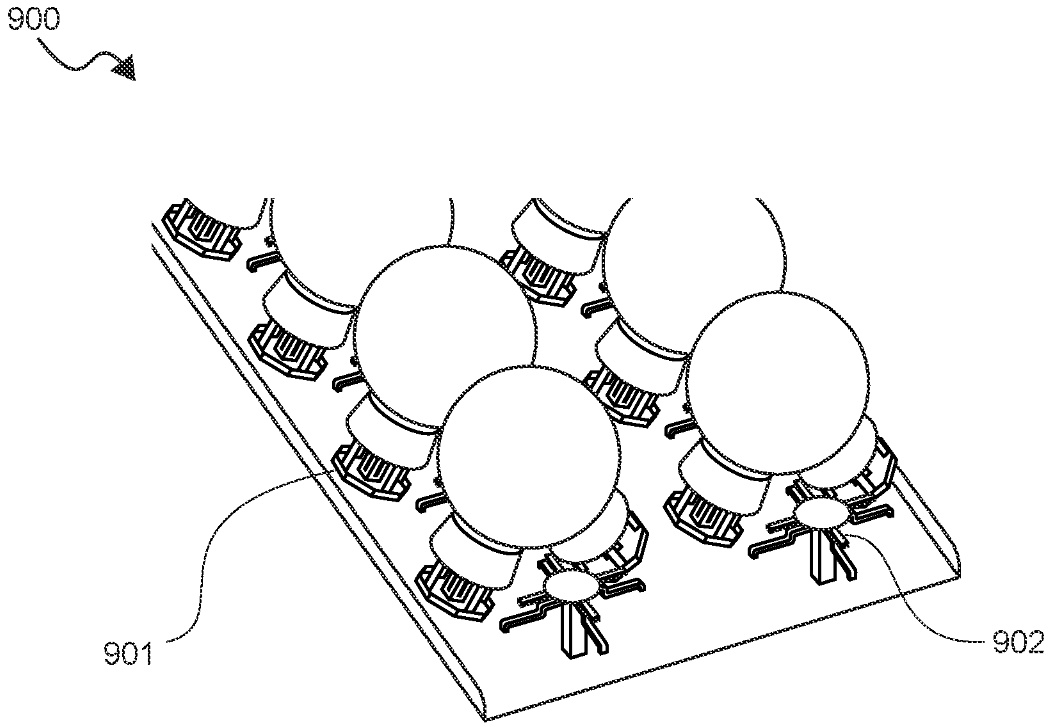
FIG. 9 illustrates a multibeam multiband antenna array having a plurality of circular radiating elements, LB crosses, and a flat reflector.
Figure 10:
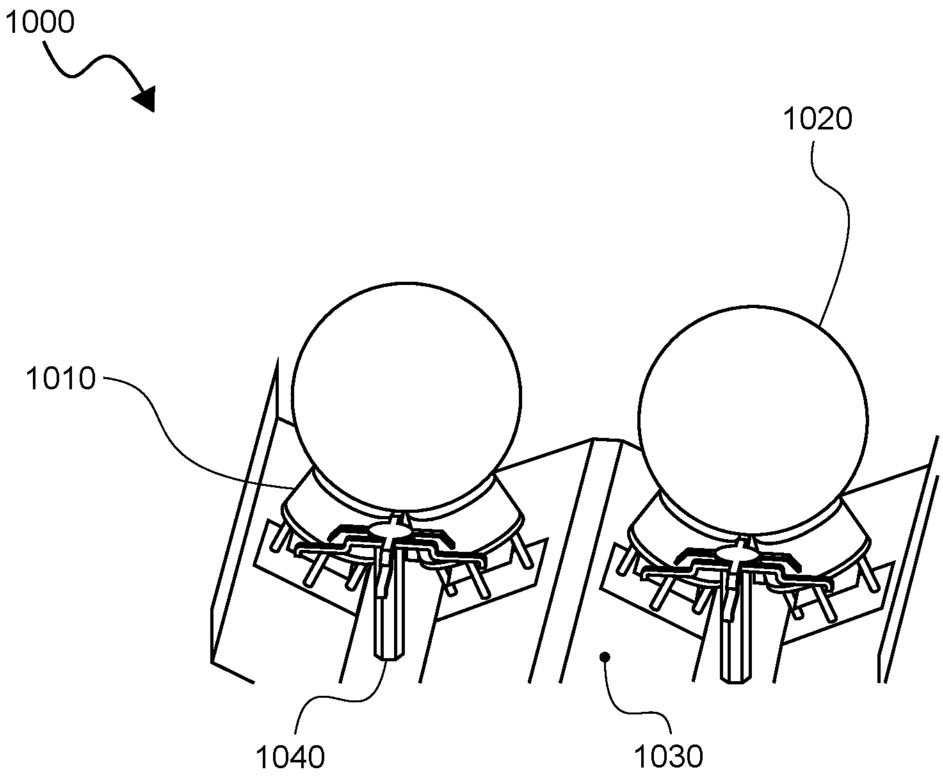
FIG. 10 illustrates a multibeam multiband antenna array having a plurality of circular radiating elements, LB crosses, and a non-flat reflector.

For further antenna total width reduction, combination of LB circular elements with other type of LB elements can be advantageous. As schematically shown in FIG. 8, LB crosses are used in addition to circular LB elements. LB cross 802 has polarization +/−45° with arms oriented in vertical and horizontal directions. Arms of LB cross 802 can be fitted between HB elements 801 and HB secondary lenses (not shown). In an embodiment, circular LB elements 803 can be combined with LB cross elements 802, providing better isolation between LB columns, and grating lobes' reduction. Lenses of different diameter can be included. In a preferred embodiment, lens 805 is a larger lens surrounded by an LB element, lens 806 is a smaller lens for higher frequencies such as FB, and even smaller lenses can be integrated, such as lens 807. Advantageously, this antenna configuration provides for improved isolation between all 4 LB ports. Also, smaller vertical spacing between HB elements 801 can benefit to HB sidelobe reduction. Moreover, the antenna configuration depicted FIG. 8 can provide about 10%-15% reduction of antenna width, as compared to the arrays shown in FIGS. 5-7. FIG. 9 depicts a HB lensed array 900, with HB elements 901 and LB crosses 902 arranged in two columns, where the reflector 903 is flat. In some other embodiments, as depicted by FIG. 10, a reflector 1030 can have non-flat shape to allow HB elements 1010 to be moved (rotated) around lens 1020 for beam tilting while LB elements 1040 are integrated into the arrangement. In a preferred embodiment, the reflector 1030 has a curvature. In related embodiment, reflector 1030 has a polygonal shape.

The discussion herein provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of components, properties such as orientation, location, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An arrangement of RF elements coupled to a lens comprising:

a first RF element configured to transmit or receive a first RF band signal;

wherein the first RF element is shaped as a perimeter of the lens, has a feed gap, and is arranged on a first plane;

a frequency-selective surface ("FSS") at least partially disposed within the lens, and arranged on a second plane different from the first plane; and a second RF element, different from the first RF element, configured to transmit or receive a second RF band signal, different from the first RF band signal, the second RF band signal passing through the FSS;

wherein the FSS comprises a transparent surface disposed within the lens and continuous with a reflecting surface disposed outside the lens;

wherein the FSS and the reflecting surface are reflective of the first RF band signal, and the transparent surface is transparent to the second RF band signal.

2. The arrangement of claim 1, wherein the first RF element further comprises at least a first sub-element and a second sub-element.

3. The arrangement of claim 2, wherein the first sub-element and the second sub-element are coupled together via a balun.

4. The arrangement of claim 3, wherein the balun comprises a capacitor.

5. The arrangement of claim 3, wherein the balun comprises a resistor.

6. The arrangement of claim 3, wherein the balun comprises an inductor.

7. The arrangement of claim 2, wherein at least the first sub-element and the second sub-element are arranged to form a shape selected from the group consisting of a circle and a polygon.

8. The arrangement of claim 1, wherein the first RF element comprises a band filter.

9. The arrangement of claim 8, wherein the band filter is a stop-band filter.

10. The arrangement of claim 8, wherein the band filter is a low-pass filter.

11. The arrangement of claim 1, wherein the first RF band signal is a low-band (LB) signal.

12. The arrangement of claim 1, wherein the second RF band signal is an F-band (FB) signal.

13. The arrangement of claim 1, wherein the second RF band is an H-band (HB) signal.

14. The arrangement of claim 1, wherein the first RF band signal and the second RF band signal cover the same geographic area.

15. The arrangement of claim 1, wherein the first RF element is positioned at an end of the lens opposite to the second RF element.

16. The arrangement of claim 1, wherein the first RF element is positioned about the lens such that the first RF element encloses a portion of the lens.

17. The arrangement of claim 1, wherein the FSS is positioned at a portion of the lens between the first RF element and the second RF element, and closer to the second RF element than the first RF element.

18. The arrangement of claim 1, wherein a portion of the FSS extends outside of the lens.

* * * * *